June 27, 1967   L. A. CARLSMITH   3,327,862
ROTARY DRUM FILTER

Filed Oct. 31, 1966   2 Sheets-Sheet 1

INVENTOR.
LAWRENCE A. CARLSMITH
BY
David W. Tillott
ATTORNEY

June 27, 1967  L. A. CARLSMITH  3,327,862
ROTARY DRUM FILTER

Filed Oct. 31, 1966  2 Sheets-Sheet 2

INVENTOR.
LAWRENCE A. CARLSMITH
BY
David W. Tilhott
ATTORNEY

United States Patent Office 3,327,862
Patented June 27, 1967

3,327,862
ROTARY DRUM FILTER
Lawrence Allan Carlsmith, Amherst, N.H., assignor to Improved Machinery Inc., Nashua, N.H., a corporation of Delaware
Filed Oct. 31, 1966, Ser. No. 590,981
7 Claims. (Cl. 210—392)

This invention relates generally to improvements in rotary drum filters and, more particularly, to vacuum filters of the type disclosed in the copending United States Patent application, Ser. No. 561,294, filed June 28, 1966, and now abandoned, by Ralph W. Turner Jr.

The above-mentioned application discloses a rotary drum filter having an arcuate-shaped valve located immediately below the circumference of the filter about midway of its length. In the trade, this type of drum filter is known as a "center valve filter." In order to anchor the valve against rotating with the drum, the drum is provided with a continuously annular slot circling its circumference. An externally-mounted stationary "shoe" extends through this slot and engages the valve to lock it against rotation.

The principal object of this invention is to eliminate or close the annular slot circling the circumference of the drum.

Other important objects are: to provide a center valve filter having an internal means for anchoring the valve against rotating with the drum; to provide an internal anchoring means for the valve of a center valve filter which can be readily adjusted to vary the rotary position of the valve and is loosely connected to the valve to allow the valve to readily follow the drum during rotation; and to provide a center valve filter having a screening area which extends over the full length of the drum circumference.

In general, the foregoing objects are achieved by closing the external annular slot in the drum circumference, mounting the arcuate valve in the drum in a manner so that it is under balanced fluid pressures acting in both the longitudinal and radial directions and anchoring the valve by a radial arm supported on the axis of the drum and loosely connected to the valve to allow the valve a limited amount of movement relative to the arm in both the axial and radial directions so that the valve is free to follow its proper path in the drum without binding or other interference caused by the radial arm. In some cases the filter screen can be continued across the annular slot to increase the filtering area of the drum.

This invention is described in connection with the accompanying drawings wherein.

Figure 1:
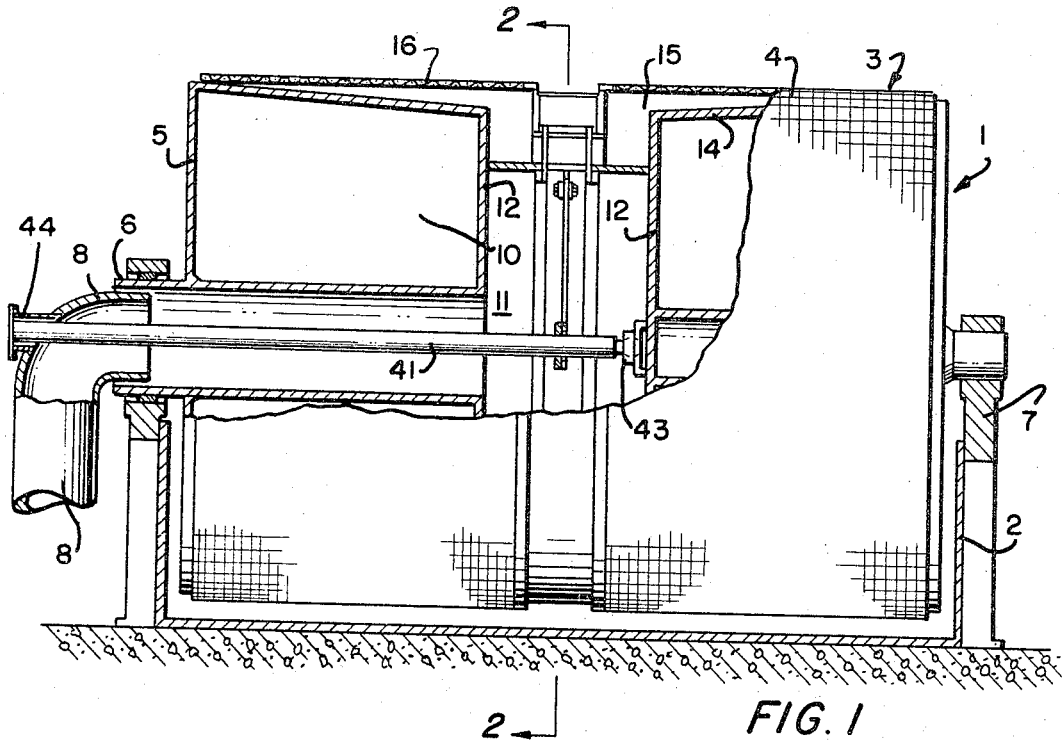
FIG. 1 is a longitudinal vertical elevation of a rotary drum filter with the tank and portions of the drum being cut away and shown in section.

The drum filter 1 shown in FIG. 1 includes a tank 2 adapted to hold a liquid slurry containing paper making fibers. A drum 3 is partially immersed in the slurry in the tank 2 and includes a cylindrical circumference 4 and a pair of end plates 5. A pair of trunnions are mounted on the end plates 5 for rotatably supporting the drum in bearing supports 7 located at the opposite ends of the drum 3. One of the trunnions is a hollow trunnion 6 adapted to drain the interior of the drum 3. A vacuum pipe 8 extends into the hollow trunnion 6 located at one end of the drum 3 with means provided between the pipe 8 and the trunnion 6 to allow the drum 3 to rotate about the pipe 8. As is conventional, the pipe 8 is used as a drain for filtrate from the drum 3. The drain or flow of filtrate through the pipe 8 creates and applies a vacuum to the interior of the drum 3. A cake discharge roll 9 is mounted along the longitudinal side of the tank 2 for removing the fiber cake from the drum 3 in the usual manner. All of the foregoing structure is conventional in the rotary filter drum art.

The drum 3 is constructed essentially like that disclosed in the previously mentioned United States patent application, Ser. No. 561,294, filed June 28, 1966 by Ralph W. Turner, Jr. The drum 3 is divided midway of its length into a pair of axially aligned and spaced drum halves 10 with an annular space 11 located between the inner ends or partitions 12 of the two drum halves 10. Both drum halves 10 rotate as a single drum 3.

The circumference of each drum half 10 includes a series of longitudinally extending filtrate compartments 13 spaced circumferentially around the drum half 10. Each filtrate compartment 13 includes a floor 14 and a pair of circumferentially spaced sidewalls or ribs 15 extending longitudinally along the floor 14. Generally, the floor 14 of all the compartments 13 in a drum half 10 is a single annular structure. A series of support wires are wound circumferentially around the top edges of the ribs 15 and a filter screen 16 is wonud over the wires. The above details of the filtrate compartments 13 are conventional.

In each drum half 10, the inner end of each of the ribs 15 is extended inwardly beyond its drum partition and fixed to a reinforcing ring 18 located inward of the partition 12. The reinforcing ring 18 of each drum half 10 is axially spaced from the other reinforcing ring 18 with both rings 18 being rigidly connected together by a series of short reinforcing tubes 19 circumferentially spaced around the drum 3. The rings 18 and reinforcing tubes 19 serve to interconnect the two drum halves 10 together. The inner end edges of the screen 16 are supported on respective annular rims 20 mounted on the reinforcing rings 18, as shown in FIG. 3.

The inner portions of the ribs 15, located inwardly of the partitions 12 are further extended radially inward along its respective partition 12 to terminate at an annular wall 25 projecting longitudinally from the partition 12 and located radially inwardly of the reinforcing ring 18. As shown in FIG. 3, the foregoing arrangement of the ribs 15 forms an L-shaped passage 26 extending from the inner end of each filtrate compartment 13 and terminating in a drain outlet 27 located between the reinforcing ring 18 and the inner edge of the annular wall 25. The drain outlets 27 of each drum half form an annular band of outlets 27 circling the drum half and the outlets of the two drum halves are longitudinally spaced to locate an annular valve space 28 between the drum halves 10. The outer edges of the spaced annular rings 18 are joined by an annular strip 30 detachably fastened to the rings 18.

Figure 3:
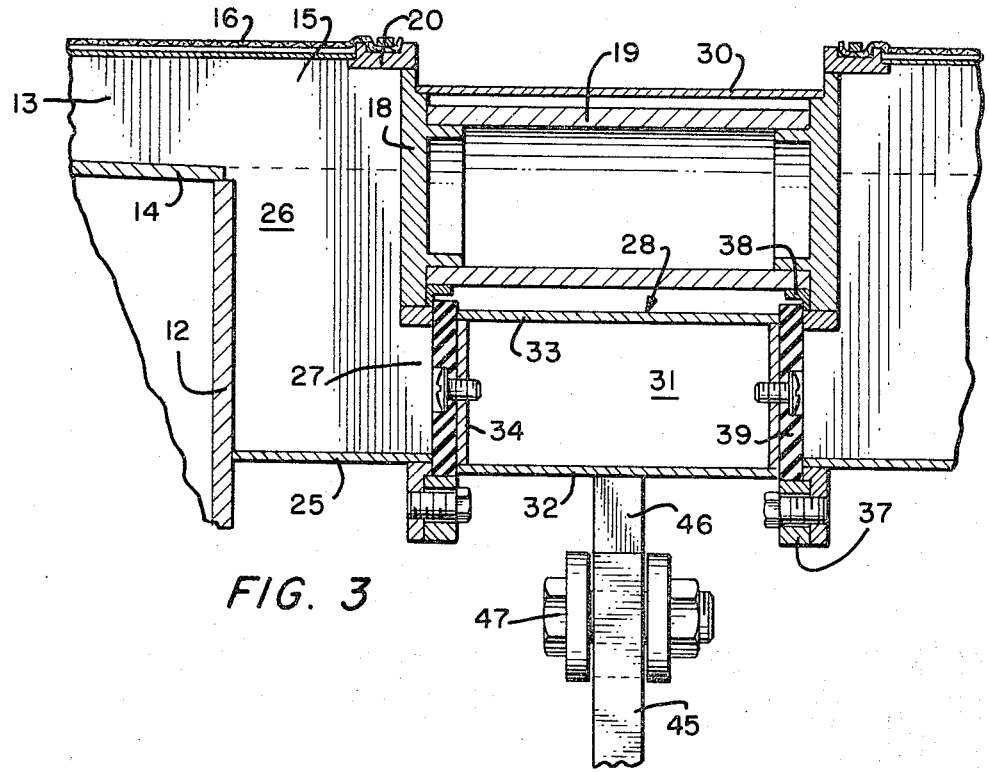
FIG. 3 is a fragmentary enlarged view of a portion of FIG. 1.

An arcuate valve 31 is located in the annular valve space 28 between the filtrate compartment drain outlets 27 of the two drum halves 10 in a slidable and substantially sealing relationship with the drain outlets 27, as shown in FIG. 3. The arcuate valve 31 includes an arcuately extending bottom 32, an arcuate top 33 and longitudinally spaced sides 34. The sides 34 close the drain outlets 27 as the valve 31 passes the outlets 27. The valve 31 may include ports (not shown) for venting the outlets to atmosphere when desired.

Figure 2:
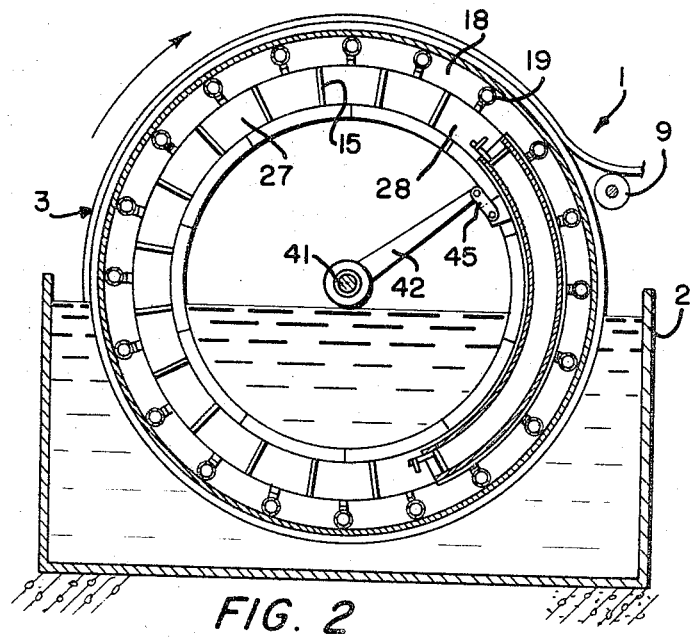
FIG. 2 is a section taken on the line 2—2 of FIG. 1.

The filter drum 3 rotates in a clockwise direction, as indicated by the arrow in FIG. 2, while the valve 31 remains stationary. Soon after a portion of the drum periphery enters the slurry in the tank 2, a vacuum is applied to the filtrate compartments 13 beneath the immersed portion of the drum periphery. Thereafter a cake of fibers progressively builds up on the screen 16 until the drum periphery rises out of the slurry. After the filter cake rises from the slurry, it may be alternately dried and washed (the washing showers are not shown in the drawings). Eventually the cake reaches the valve 31 where the vacuum in the drum is sealed off from the filtrate compartments 13 to release the cake from the vacuum. Thereafter the cake is removed from the drum by the cake discharge roll 9. It is believed that this simple explanation of the filter drum operation is sufficient since this type of operation is conventional in the rotary filter drum art.

The valve 31 "floats" or slides in circular trackways or ways attached to the drum. A pair of inner trackways 37 are detachably mounted beneath the inner edges of the annular walls 25 for holding the valve 31 against dropping radially inward. A pair of outer trackways 38 are mounted adjacent the inner edges of the reinforcing rings 18 for slidably engaging the top edges of the valve 31. The sides 34 of the valve 31 include strips 39 of anti-friction material for engaging the trackways 37 and 38 to reduce friction and allow the valve 31 to slide more freely in the trackways.

The valve 31 is held in a predetermined stationary position in the trackways 37 and 38 by an internal anchor means as the drum rotates. Looking at FIGS. 1 and 2, this anchor means includes a shaft 41 extending axially through a part of the drum 3 and a radial arm 42 fixed on the shaft 41. The shaft 41 is supported at its inner end by a bearing 43 mounted on a drum partition 12 and has its outer end adjustably fixed to the drain pipe 8 by an attachment means such as a locking clamp 44. The shaft 41 can be adjusted in the clamp 44 for locating the arm 42 in a selected position.

The outer end of the radial arm 42 is joined to the valve 31 by a link 45 pivoted to the arm 42 and to a lug 46 fixed on the valve 31. The bolts 47 interconnecting the link 45 to the radial arm 42 and the lug 46 are loosely mounted to allow the valve 31 a slight amount of longitudinal movement relative to the radial arm 42. The link 45 allows the valve 31 a limited amount of radial movement relative to the radial arm 42. Allowing the valve 31 to move relative to the radial arm 42 for a limited distance lets the valve 31 follow the ways 37 and 38 freely without interference from the arm 42 while being anchored against rotation by the arm 42. Since the valve 31 is free to move axially and radially relative to the radial arm 42, it is described as "floating" in the ways 37 and 38 as the drum rotates.

The foregoing arrangement provides a "balanced" valve design. By this, it is meant that the fluid pressure forces acting on the sidewalls 34 of the valve 31 are balanced and the pressure forces acting on the top 33 and bottom 32 are also balanced. Thus, the valve 31 is not forced in any direction by the fluid pressures acting on it.

The valve 31 in the FIG. 3 embodiment can be removed by detaching a section of the annular strip 30, reaching through the opening thus formed and detaching sections of the inner trackways 37 to allow the valve 31 to drop radially inward, detaching the valve 31 from the radial arms 42 and withdrawing the valve 31 endwise between the reinforcing tubes 19. The longitudinally extending portions of the trackways 38 are broken away between the reinforcing tubes 19 to allow the valve 31 to be withdrawn in the above manner. This procedure is desirable in cases where it is dangerous for a mechanic to enter the interior of the drum 3 through a porthole (not shown) provided in an end wall 5.

*Second embodiment*

Figure 4:
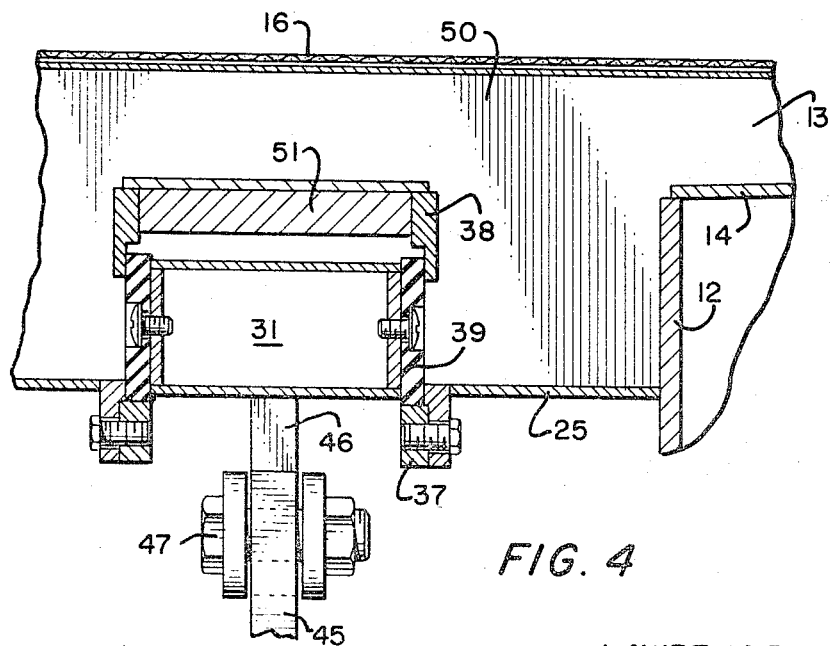
FIG. 4 is a fragmentary enlarged view similar to FIG. 3 and showing a second embodiment of the invention.

The second embodiment shown in FIG. 4 is identical to the first embodiment except that the ribs or sidewalls 50 of the filtrate compartments 13 are extended continuously over the full length of the drum 3, thus eliminating the rings 18, the reinforcing tubes 19, the rims 20 and the annular strip 30. The upper trackways 38 are attached to the bottom of the ribs 50 with an annular wall 51 interconnecting the upper trackways 38. This embodiment allows the screen 16 to extend over the full length of the drum 3. The valve 31 must be removed or mounted from within the drum.

Although two embodiments of the invention are described and illustrated, it will be understood that the invention is not limited simply to these embodiments, but contemplates other embodiments and variations which utilize the concepts and teachings of this invention.

Having described my invention, I claim:

1. A rotary drum filter having a filtrate cycle including an arcuate drum portion wherein sub-atmospheric pressure is applied for filter cake accretion and an arcuate drum portion wherein said sub-atmospheric pressure is cut off for filter cake removal, said filter comprising:
   a rotatable cylindrical drum having a pair of axially spaced series of axially extending filtrate compartments arranged in the form of an annular volume adjacent the periphery of said drum and circling said drum;
   each compartment having an open end located generally intermediate the ends of said drum with said open ends forming a series or band of filtrate outlets circling said drum;
   a pair of axially spaced circularly extending ways mounted on said drum adjacent said filtrate outlets;
   a stationary valve positioned over a portion of said filtrate outlets and at least partly extending around the periphery of said drum where the subatmospheric pressure is cut off for co-operation with said filtrate outlets for control of said sub-atmospheric pressure during said cycle portions;
   said valve being slidably mounted and supported on said ways to allow said drum to rotate while said valve remains stationary;
   said ways holding and preventing said valve from falling or moving radially or axially away from its proper position in said ways; and
   means located internally within said drum anchoring said stationary valve against rotating with said drum.

2. The rotary drum filter of claim 1 wherein:
   said means for anchoring said valve against rotating with said drum is loosely connected to said valve providing limited movement in both the axial and radial directions between said valve and said means so that said valve is free to follow said ways and, when necessary, to move both axially and radially relative to said means.

3. The rotary drum filter of claim 2 wherein:
   said anchoring means includes a stationary shaft extending along the axis of said drum and a radial arm fixed to said shaft.

4. The rotary drum filter of claim 3 wherein:
   said radial arm is connected to said valve by a connection which allows said valve to move relative to said radial arm in both the axial and radial directions over a limited distance so that said valve can follow said ways as said drum rotates.

5. The rotary drum filter of claim 4 wherein:
   said stationary shaft is mounted on a support which allows said shaft to be adjusted rotatively to vary the anchoring position of said valve in said drum.

6. The rotary drum filter of claim 4 including:
   a link interconnecting said radial arm to said valve and pivoted to both said radial arm and said valve.

7. The rotary drum filter of claim 1 including:
   a filter screen circling the circumference of said drum and extending along the full length of the drum.

No references cited.

SAMIH N. ZAHARNA, *Primary Examiner.*